US012553166B2

(12) United States Patent
Dong et al.

(10) Patent No.: US 12,553,166 B2
(45) Date of Patent: Feb. 17, 2026

(54) ROBOT AND METHOD FOR SEWING AN OBJECT

(71) Applicant: ABB SCHWEIZ AG, Baden (CH)

(72) Inventors: Yiming Dong, Shanghai (CN); Haiyang He, Shanghai (CN); Jibo Yang, Shanghai (CN); Qi Lu, Shanghai (CN)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 18/926,502

(22) Filed: Oct. 25, 2024

(65) Prior Publication Data

US 2025/0043477 A1 Feb. 6, 2025

Related U.S. Application Data

(63) Continuation of application No. PCT/CN2022/094779, filed on May 24, 2022.

(51) Int. Cl.
*D05B 19/14* (2006.01)
*D05B 1/20* (2006.01)
*D05B 69/30* (2006.01)

(52) U.S. Cl.
CPC ............ *D05B 19/14* (2013.01); *D05B 1/20* (2013.01); *D05B 69/30* (2013.01)

(58) Field of Classification Search
CPC ........ D05D 19/14; D05D 19/12; D05D 57/30; D05D 69/30; D05D 55/14; D05D 1/02; D05D 1/20; B25J 18/04; B25J 11/00
See application file for complete search history.

(56) References Cited

U.S. PATENT DOCUMENTS 4,762,455 A * 8/1988 Coughlan .............. B25J 19/023
901/8
5,095,834 A * 3/1992 Braun ...................... D05B 3/02
112/443

(Continued)

FOREIGN PATENT DOCUMENTS

CN 204198998 U * 3/2015
CN 109457400 A 3/2019

(Continued)

OTHER PUBLICATIONS

KSL RS 530 Two Needle Head Datasheet; "Connecting Composites"; 2 pages.

(Continued)

*Primary Examiner* — Danny Worrell
(74) *Attorney, Agent, or Firm* — Greenberg Traurig, LLP

(57) ABSTRACT

Embodiments of present disclosure relates to a robot and method for sewing an object. The robot includes a first robotic arm adapted to hold a needle, the needle carrying a length of a thread, a second robotic arm adapted to hold the needle, and a controller configured to move the first and second robotic arms to perform a plural of sewing operations so as to form a plural of stitches on the object A sewing operation includes moving the first robotic arm a first distance to cause the needle to penetrate a part of the object; and moving the second robotic arm to hold a penetration portion of the needle and pull the whole needle out of the object after the needle being released by the first robotic arm.

20 Claims, 8 Drawing Sheets

(56) References Cited

U.S. PATENT DOCUMENTS

| | | | | |
|---|---|---|---|---|
| 5,313,897 | A * | 5/1994 | Katamine | D05B 73/00 |
| | | | | 112/470.13 |
| 5,381,743 | A * | 1/1995 | Moll | D05B 23/00 |
| | | | | 112/470.13 |
| 5,400,730 | A * | 3/1995 | Moll | D05B 59/04 |
| | | | | 112/168 |
| 5,875,726 | A * | 3/1999 | Keilmann | B25J 9/0084 |
| | | | | 112/475.08 |
| 5,988,085 | A * | 11/1999 | Martz | D05B 39/00 |
| | | | | 112/475.08 |
| 7,363,869 | B1 * | 4/2008 | Yang | D05B 15/02 |
| | | | | 112/62 |
| 9,512,547 | B2 * | 12/2016 | Wenzel | D05B 57/04 |
| 10,240,271 | B2 * | 3/2019 | Freer | D05B 23/00 |
| 10,358,754 | B2 * | 7/2019 | Sano | B25J 18/04 |
| 10,450,683 | B2 * | 10/2019 | Hirayama | D05B 35/00 |
| 10,626,535 | B2 * | 4/2020 | Kadowaki | B25J 15/0019 |
| 10,815,594 | B2 * | 10/2020 | Goto | D05B 33/00 |
| 11,174,579 | B2 * | 11/2021 | Ikadai | D05B 69/02 |
| 2017/0028937 | A1 * | 2/2017 | Sekino | B60N 2/7017 |
| 2017/0347754 | A1 | 12/2017 | Fuerst, Jr. et al. | |
| 2025/0043477 | A1 * | 2/2025 | Dong | B25J 11/005 |

FOREIGN PATENT DOCUMENTS

| | | | | |
|---|---|---|---|---|
| CN | 109629122 | A | | 4/2019 |
| CN | 211596014 | U * | | 9/2020 |
| CN | 118722827 | A * | 10/2024 | D05B 15/00 |
| CN | 119836496 | A * | 4/2025 | D05B 19/12 |
| WO | WO-2023225862 | A1 * | 11/2023 | B25J 19/023 |

OTHER PUBLICATIONS

Yang Hu Et al.; IEEE/ASME Transactions on Mechatronics; "Design, Fabrication, and Testing a Semiautomatic Sewing Device for Personalized Stent Graft Manufacturing"; vol. 24, No. 2, Apr. 2019; pp. 517-526.

* cited by examiner

ROBOT AND METHOD FOR SEWING AN OBJECT

CROSS-REFERENCE TO RELATED APPLICATIONS

This application claims priority to and is a continuation application of international patent application number PCT/CN2022/094779, filed on May 24, 2022, which is herein incorporated by reference in its entirety.

FIELD

Embodiments the present disclosure generally relate to a field of industrial robots, and more particularly to industrial robots for sewing an object.

BACKGROUND

In automobile industries, more and more cars are manufactured to equip with leather covered steering wheel. The leather not only improves an outer appearance of the steering wheel but also improves comforts of hand feeling. That is because the leather cover can resist slippery caused by sweat, which means safer drive.

Typically, leather cover is manually fixed to a blank steering wheel by a manual work. A worker firstly fixes the leather cover to the blank steering wheel by gluing and then sews the leather cover to the blank steering wheel stitch by stitch. This is labor intensive and time-consuming. For a single steering wheel, to complete this assembly process, it takes up to one hour even for an experienced operator. There is an increasing need to automate the assembly process by industrial robots.

SUMMARY

Example embodiments of the present disclosure provide a robot and a method for sewing object which can perform automatic sewing using a needle.

In a first aspect of the present disclosure, it is provided a robot for sewing an object. The robot for sewing an object comprises: a first robotic arm adapted to hold a needle, the needle carrying a length of a thread, a second robotic arm adapted to hold the needle, and a controller configured to move the first and second robotic arms to perform a plural of sewing operations so as to form a plural of stitches on the object, each sewing operation comprising: moving the first robotic arm a first distance to cause the needle to penetrate a part of the object; and moving the second robotic arm to hold a penetration portion of the needle and pull the whole needle out of the object after the needle being released by the first robotic arm.

According to the present disclosure, by cooperation operations of the first and second robotic arms, the needle can be easily controlled to automatically penetrate the object. Thus, the object can be sewn by automatically, which significantly reduce reliance on human power.

In some embodiments, the object may include a flexible outer surface and pre-stitches formed on the outer surface, each of the pre-stitch includes a thread section including a top side and an opposite bottom side facing the outer surface, and the controller is configured to cause the needle to go across the thread section along a path defined between the bottom side of the thread section and the outer surface of the object. By forming pre-stitches on the object, the sewing operation performed by the robot can be simplified.

In some embodiments, for the each sewing operation the controller may be configured to: determine a position to be sewed which corresponds to a thread section of the pre-stitches; move the needle to a ready position at a first lateral side of the thread section which is offset from the position to be sewed by an offset distance; determine a posture of the needle such that a longitudinal axis of the needle is tangent to the outer surface of the object at which the path is located; and move the needle the first distance from the first lateral side of the thread section to a second opposite lateral side of the thread section with the needle in the determined posture to cause the needle to go across the thread section, the first distance being larger than the offset distance. With this arrangement, the needle can be precisely controlled and can penetrate the object with reduced scratches.

In some embodiments, the controller may be configured to: depress the needle in a direction perpendicular to the outer surface at the ready position toward the outer surface so as to deform the outer surface of the object; and linearly move the needle the first distance from the first lateral side of the thread section to the second opposite lateral side of the thread section, with the needle being maintained at the depressed state. By deforming the outer surface of the object, the needle can penetrate the object without scratches.

In some embodiments, the robot may further comprise a camera configured to capture an image of the object, the controller being configured to identify a plural of positions to be sewed based on the image from the camera.

In some embodiments, the controller may be configured to generate a sewing pattern which defines the positions to be sewed in order based on the identified plural of positions to be sewed.

In some embodiments, the first and second robotic arms may be adapted to adjust a gripping length of the needle respectively so that a tip of the needle is located to the same position relative to the respective robotic arms. With the arrangement, the movement paths and the control of the needle can be significantly simplified.

In some embodiments, the first robotic arm may be adapted to hold a root portion of the needle, and the second robotic arm is adapted to hold a tip portion of the needle.

In some embodiments, the controller may be further configured to handover, for each sewing operation, the needle held by the second robotic arm back to the first robotic arm, and to perform a subsequent sewing operation by repeating the each sewing operation.

In some embodiments, the object may comprise a cover pre-wrapped around a steering wheel, the cover being made of leather, leatherette, or fabric, and the cover comprises two rows of plural of pre-stitches adjacent to each other which define a sewing region for the sewing operations.

In some embodiments, the robot may further comprise a second camera configured to capture an image of the object, the controller being configured to visually inspect the object based on the image from the second camera and to provide an inspection result indicating a suitability of whether the object can be sewed by the apparatus before the sewing operation or indicating a sewing quality after the sewing operation.

In some embodiments, the robot may further comprise a thread drawing device configured to draw a loose part of the thread at a fixed end from the fixed end to a movable end, the thread comprising the fixed end fixed on the object and a movable end tied to the needle. With the thread drawing device, the control and path planning of the robot for sewing an object is greatly simplified.

In some embodiments, the thread drawing device may comprise: a drive assembly comprising a drive wheel comprising a working platform for supporting the thread on the needle carried by the second robotic arm, a press assembly comprising a pressing member configured to move between a first position at which the pressing member engages the working platform to clamp the thread to be pulled therebetween and a second position at which the pressing member disengages from the working platform to release the thread to be pulled; and a motor configured to rotate the drive wheel when the pressing member is at the first position so as to draw the loose part of the thread at the fixed end to the movable end.

In some embodiments, the robot may further comprise a device for adjusting sewn threads on the object, wherein the device for adjusting sewn threads comprises an adjusting tool, wherein the adjusting tool is caused to partially go across the sewn threads along a path defined between a bottom side of one sewn thread and an outer surface of the object and are moved upward away from the outer surface so as to adjust pitches between the sewn stitches, wherein the sewn thread comprise a first end fixed to the object and a second end, a plural of stitches are formed across a sewing zone on the object between the first end and the second end, and each stitch comprises the thread section including a top side and the opposite bottom side. With the device for adjusting sewn threads on the object, joining strength of the seam joint formed by the stitches can be improved. Also, outer appearance of the sewn product is improved.

In a second aspect of the present disclosure, it is provided a method for sewing an object. The method comprises: moving a first robotic arm a first distance to cause a needle held by the first robotic arm to penetrate a part of the object; moving the second robotic arm to hold a penetration portion of the needle and pull the whole needle out of the object after the needle being released by the first robotic arm; placing a part of the thread by the second robotic arm on a member of a thread drawing device; and operate the thread drawing device to draw a loose part of the thread at an fixed end from the fixed end to a second end, the thread comprising the fixed end fixed on the object and a second end tied to the needle.

In some embodiments, the method may further comprise transferring the needle held by the second robotic arm back to the first robotic arm, and to perform a subsequent sewing operation.

DESCRIPTION OF DRAWINGS

Through the following detailed descriptions with reference to the accompanying drawings, the above and other objectives, features and advantages of the example embodiments disclosed herein will become more comprehensible. In the drawings, several example embodiments disclosed herein will be illustrated in an example and in a non-limiting manner, wherein.

Throughout the drawings, the same or similar reference symbols are used to indicate the same or similar elements.

DETAILED DESCRIPTION OF EMBODIMENTS

Figure 1:
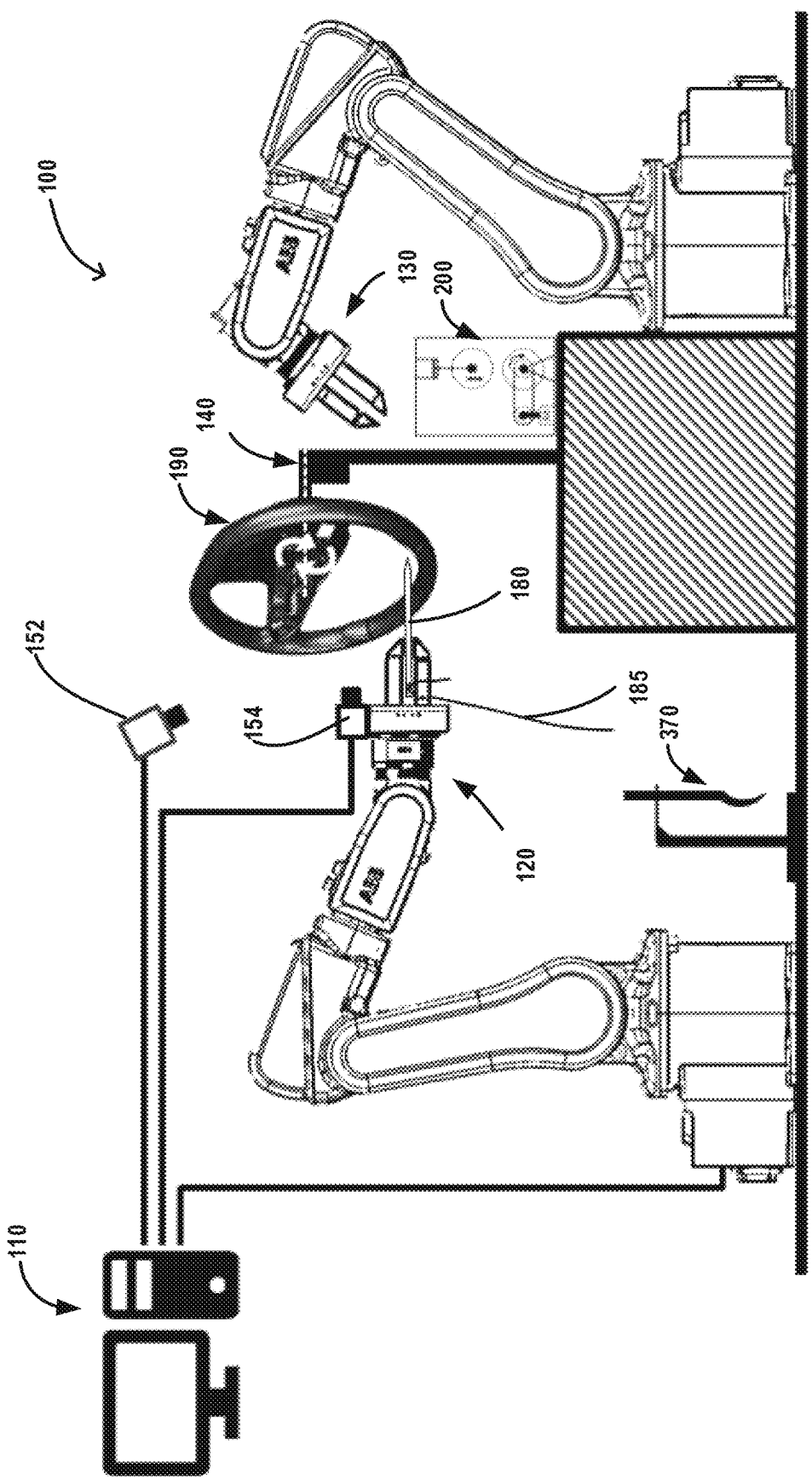
FIG. 1 is a schematic view of a robot for sewing an object according to one example embodiment of the present disclosure.

Principles of the present disclosure will now be described with reference to several example embodiments shown in the drawings. Though example embodiments of the present disclosure are illustrated in the drawings, it is to be understood that the embodiments are described only to facilitate those skilled in the art in better understanding and thereby achieving the present disclosure, rather than to limit the scope of the disclosure in any manner.

The term "comprises" or "includes" and its variants are to be read as open terms that mean "includes, but is not limited to." The term "or" is to be read as "and/or" unless the context clearly indicates otherwise. The term "based on" is to be read as "based at least in part on." The term "being operable to" is to mean a function, an action, a motion or a state that can be achieved by an operation induced by a user or an external mechanism. The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below. A definition of a term is consistent throughout the description unless the context clearly indicates otherwise.

There is an increasing need to automate an assembly process for sewing a cover to a steering wheel. The present invention proposes a novel robot system for sewing which can sew a cover onto a steering wheel. It is to be understood that although the present disclosure takes a steering wheel with a cover as an example to illustrate principles of the present invention, this is merely illustrative, and the inventive concepts are applicable to any other objects that needs to be sewn.

FIG. 1 shows a robot system 100 for sewing an object. As shown in FIG. 1, the robot system 100 comprises a support 140 for supporting the object to be sewed (in the shown example, a steering wheel 190, a first robotic arm 120, and a second robotic arm 130. The object may be a semi-finished product transferred from a previous process and may comprise a cover and a blank steering wheel. The cover may be primarily glued to the blank steering wheel and the cover should be further sewed according to a predetermined sewing pattern so as to tightly fix the cover onto the blank steering wheel. The robot system 100 is configured to perform the above sewing operations.

The robot system 100 further comprises a controller 110 and the controller 110 can communicate with the first robotic arm 120 and the second robotic arm 130 to control their movements so as to perform sewing operations.

The robot system 100 may further comprise one or more cameras 152, 154. The cameras 152 and 154 may be attached to different positions of the robot system so as to obtain images of the object from different perspectives. The images of the object can be sent to the controller 110. In some embodiments, the controller is configured to visually inspect the object based on the image from the cameras and to provide an inspection result indicating a suitability of whether the object can be sewed by the apparatus before the sewing operation. In some embodiments, a sewing quality after the sewing operation can be provided. In some embodiments the controller 110 is configured to identify a plural of positions to be sewed based on the image from the cameras and to generate a sewing path. The sewing path determines a sewing pattern which defines the positions to be sewed in order according to an input rule of lacing pattern based on the identified plural of positions to be sewed. According to the sewing path, the controller controls the first robotic arm 120 and the second robotic arm 130 so as to perform sewing operations. Through the plural of sewing operations, a plural of stitches are automatically formed.

The first robotic arm 120 and the second robotic arm 130 are arranged adjacent to the support 140 and thus can access the steering wheel 190 to perform sewing operations. The first robotic arm 120 and the second robotic arm 130 each comprise a gripper configured to hold the needle 180. An object 190 to be sewed, for example, leather cover, can be placed at a proper position which can be accessed by the robotic arms. A root portion of the needle 180 includes a hole. A thread 185 goes through the hole and is tied to the needle 180. A tip portion of the needle 180 is sharp and is able to penetrate the object. The support 140 may comprise a shaft which is rotatable so that positions of the steering wheel 190 can be adjusted according to positions to be sewn of the steering wheel 190.

The sewing operations of the robot system 100 are illustrated as below. The first robotic arm 120 firstly holds the needle 180 and the needle 180 is tied with a length of a thread. The second robotic arm 130 is at a standby position. The controller 110 identifies a position to be sewed and instructs the first robotic arm 120 to move to the identified position to be sewed to cause the needle 180 to penetrate a part of the steering wheel 190. Then, the controller 110 instructs the second robotic arm 130 to hold a penetration portion of the needle 180 and pull the whole needle 180 out of the steering wheel 190 after the needle 180 being released by the first robotic arm 120.

Through the above process, the needle 180 is penetrated into the object and the needle 180 is further pulled out of the object by the robot system 100. Thus, a sewn stitch is formed on the object. The above processes are repeated a numeral of times. A plural of stitches are formed on the object.

According the embodiment of the present disclosure, there are at least two robotic arms 120 and 130 that cooperatively operates so as to perform a single stitch. Compared with a one single robotic arm, two robotic arms 120 and 130 bring about technical advantages. The reason is below. To achieve sewing one stitch on the object, the needle should first penetrate a part of object using a certain force and then the needle should be pushed out of the object.

In some embodiments, the first and second robotic arms are adapted to adjust a gripping length of the needle respectively so that a tip of the needle is located to the same position relative to the respective robotic arms. The first and second robotic arms may comprise a self-adjusting mechanism to ensure that the tip of the needle is located to the same position relative to the respective robotic arms. This is advantageous when different needles are used in the robot system. The needle may be of different length. With the self-adjusting mechanism, it makes it possible to use the tip of the needle as Tool Center Point (TCP) of the robot system and the movement positions and posture of the needle can be precisely and easily controlled.

In some embodiments, the first robotic arm is adapted to hold a root portion of the needle, and the second robotic arm is adapted to hold a tip portion of the needle. This is advantageous during cooperation of the two robots. This reduces complex postures adjustments of the needle during sewing operation and thus increases automatic sewing efficiencies.

The inventor of the present disclosure finds that it is technically challenging to realize this movement of the needle by using one robotic arm. Another problem is that the length of the thread after each sewing operation changes, this makes it technically challenging of how to pull the needle with one robotic arm. With the arrangement of the present disclosure, the first robotic arm is moved by a first distance to cause the needle to penetrate a part of the object and the second robotic arm is configured to hold a penetration portion of the needle and pull the whole needle out of the object after the needle being released by the first robotic arm. It makes it possible to realize automatic sewing by a robot.

As a material for covering a steering wheel, the cover is generally soft and has a certain flexibility to improve hand manipulation sense. In some embodiments, the cover is made of leather, leatherette, fabric and the like. On the other hand, the needle is generally with a sharp tip, which means there is a high possibility that the needle may scratch an outer surface of the cover. That means, once the sharp tip of the needle directly contacts the outer surface of the cover, there is a high possibility that the cover is penetrated by the needle, which destroys an outer appearance of the cover and reduce the quality of the product.

Figure 2:
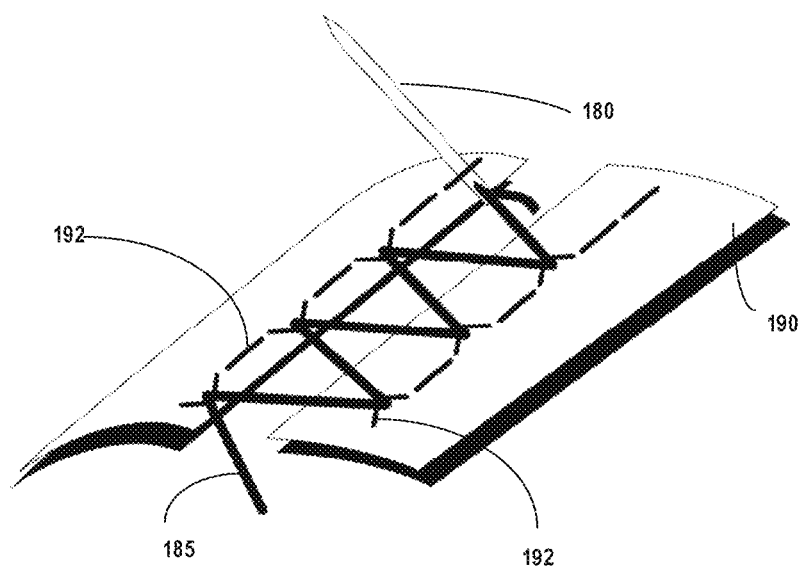
FIG. 2 is a schematic perspective view of the sewn stitches by a robot for sewing an object according to one example embodiment of the present disclosure.

In some embodiments, as shown in FIG. 2, pre-stitches 192, for example, two rows pre-stitches are formed on the outer surface of the object 190 and the pre-stitches define a sewing region. Each of the pre-stitches includes a thread section. The thread section has a top side facing an upward direction and an opposite bottom side facing the outer surface. To perform a sewing operation, the needle is moved across the thread section along a path defined between the bottom side of the thread section and the outer surface of the object. Thus, scratches caused by the needle can be reduced since the needle does not have to penetrate a body 196 of the object 190 (also referring to FIGS. 4-9). It is to be understood that the pre-stiches are merely illustrative. In some embodiments, instead of the pre-stitches 192, other measures, such as holes, or makers, may be formed in advance for facilitate sewing. Accordingly, the inventive concept illustrated herein is applicable to other application scenarios.

By cooperation operations of the first and second robotic arms 120, 130, the needle 180 moves and penetrates the object 190. After a number of sewing operations, a number of sewn stitches are automatically formed on the object 190, as shown in FIG. 2.

Referring back to FIG. 1, the cameras 152, 154 may be attached to a proper position of the robot system and is configured to obtain images of the object. The images of the object can be sent to the controller 110. The controller 110 is configured to identify a plural of positions to be sewed, i.e., a plural of the pre-stitches, based on the image from the cameras. As the needle carrying the thread penetrates each of the selected pre-stitches, a sewn pattern is generated, as shown in FIG. 2. It is to be understood that the sewn pattern in FIG. 2 is merely illustrative, and the sewn pattern may be any other proper forms.

Figure 3:
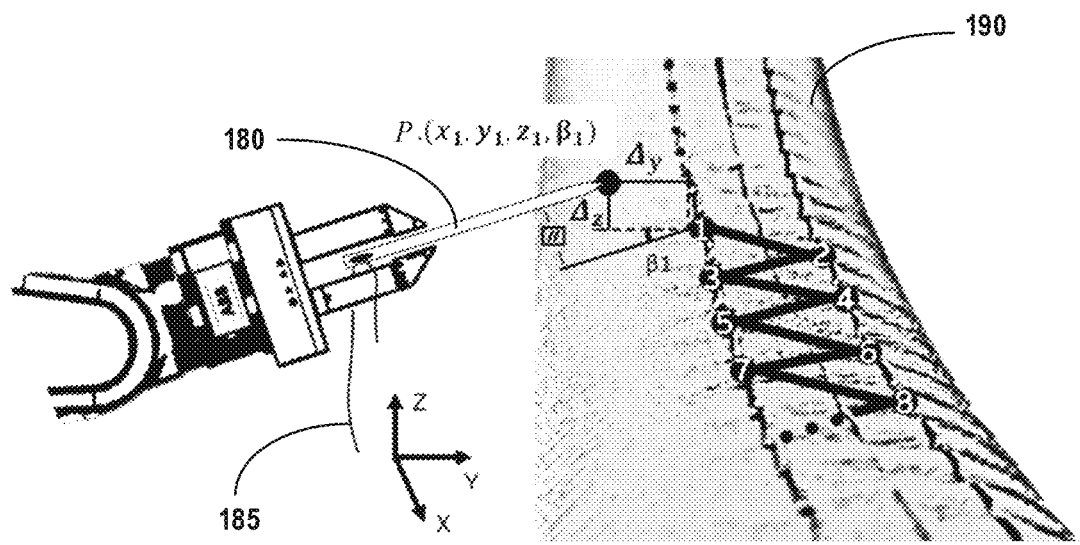
FIG. 3 is a schematic enlarged view of a portion of a robot for sewing an object according to another example embodiment of the present disclosure, showing position relationship between the needle prepared for performing a sewing operation and the object.

FIG. 3 is a schematic enlarged perspective view of a portion of a robot for sewing an object and shows a position relationship between a needle 180 held by a robotic arm and the object 190 to be sewn. As shown in FIG. 3, also referring to FIG. 4, the object 190 comprises a flexible cover 194 and a body 196. In this embodiment, when the object 190 is a steering wheel, the body 196 is the blank steering wheel. The flexible cover 194 may be primarily glued to the body 196. The flexible cover 194 may be provided with two rows of pre-stitches 192 and a region between the two rows of pre-stitches 192 defines a sewing region. The needle 180 carriers a length of thread 185 and can moves from one lateral side of each pre-stitch 192 to the other lateral side of each pre-stitch 192. By this movement the needle, the thread 185 also moves from one lateral side of each pre-stitch 192 to the other lateral side of each pre-stitch 192. For each selected pre-stitches 192, the needle repeats the above steps. A plural of stitches, i.e., the thread sections 1-2, 2-3, 3-4, 4-5, 5-6, 6-7, 7-8 and so on, are thus formed by the thread 185. Accordingly, the cover 194 is sewed onto the body 196 by tightening the cover 194 around the body 196.

As shown in FIG. 3, the needle 180 is held by one robotic arm and can be moved by the robotic arm. The object 190 is provided with a number of thread sections 192 of pre-stitches. The position of the needle is represented by a position P (x, y, z; β) which is acquired for example by the camera and the controller. x, y, z represent the coordinates in the coordinate system, the x-y plane represents a horizontal plane that a position Q to be sewed (which corresponds to a thread section of one pre-stitch) is located on the object 190, and the z axis represents a direction perpendicular to the x-y plane. The angle β represents an angle formed by the needle tip with respect to the x-y plane.

It is to be understood the P (x, y, z; β) is merely illustrative and the position of the needle tip can be represented by any other proper coordinate system. In FIG. 3, a coordinate of the needle tip is located is (x, y, z; β) and is offset by Δx, Δy, Δz with respect to the sewed position Q. The controller can use the information to control the robotic arm to move the needle 180, in particular, the needle tip, to a proper position to perform sewing.

FIGS. 4-9 are schematic sectional process views illustrating a principle of how a needle is operated to penetrate the object to perform sewing according to one example embodiment of the present disclosure, showing different states of the needle with respect to the pre-stitch. FIGS. 4-9 shows a plane view of y-z plane in which the relative position between the needle and the object can be better shown.

Figure 4:
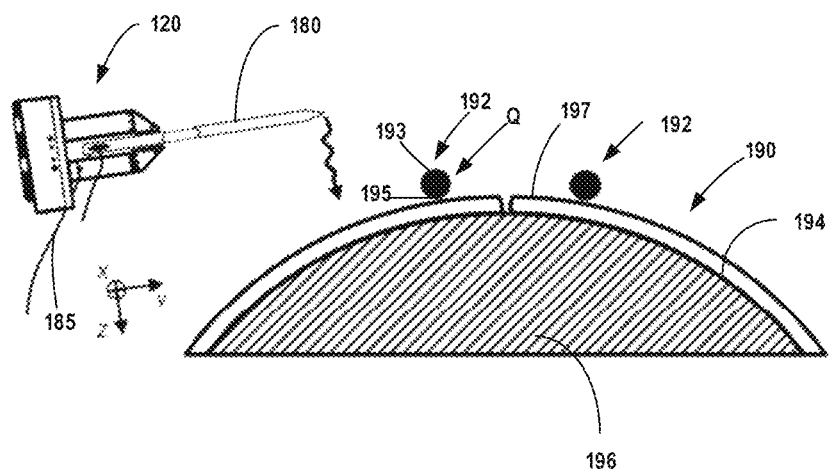
FIGS. 4-9 are schematic sectional process views illustrating a principle of how a needle is operated to penetrate the object to perform sewing according to one example embodiment of the present disclosure, showing different states of the needle with respect to the pre-stitch.

In FIG. 4, the needle is at an offset position before penetrating the object. As shown in FIG. 4, the object 190 includes a cover 194 having a flexible outer surface 197 and a plural of pre-stitches (shown as a black circle dot in FIG. 4) formed on the outer surface 197. The pre-stitch each includes a thread section 192 including a top side 193 and an opposite bottom side 195 facing the outer surface 197. In order to ensure that there is no scratching, the needle 180 is controlled to go across the thread section 192 along a path defined between the bottom side 195 of the thread section 192 and the outer surface 197 of the object 190.

Assuming that the needle is to penetrate the thread section 192 (i.e., the left side one of the thread section 192) which is denoted by Q in FIG. 4. The position Q is determined, for example by the camera 152. The positon P of the needle tip is also known by the robot. Thus, relative relationship between the needle tip and the position Q is known by the controller.

A posture that the needle 180 is to penetrate the subject is determined by the controller such that a longitudinal axis of the needle 180 is tangent to the outer surface of the object at which the path is located. In other words, the longitudinal axis of the needle 180 should be in the x-y plane. This means, when the needle 180 penetrates the object or passes through the thread section 192, a direction of the needle 180 tip is always tangent to the outer surface of the object at the positon Q. With these measures, the orientation of the needle 180 tip can be precisely controlled and scratches caused by the needle 180 tip are reduced.

Once the above parameters are determined, the robotic arm is lowered onto the object 190 and moves the needle 180 a first distance from the first lateral side of the thread section 192 to a second opposite lateral side of the thread section with the needle 180 in the determined posture to cause the needle 180 to go across the thread section. In this way, the needle 180 can penetrate the thread section 192 with less or without scratches. In some embodiments, the first distance is larger than the offset distance. This ensures that the needle 180 does penetrate the thread section 192.

Figure 5:
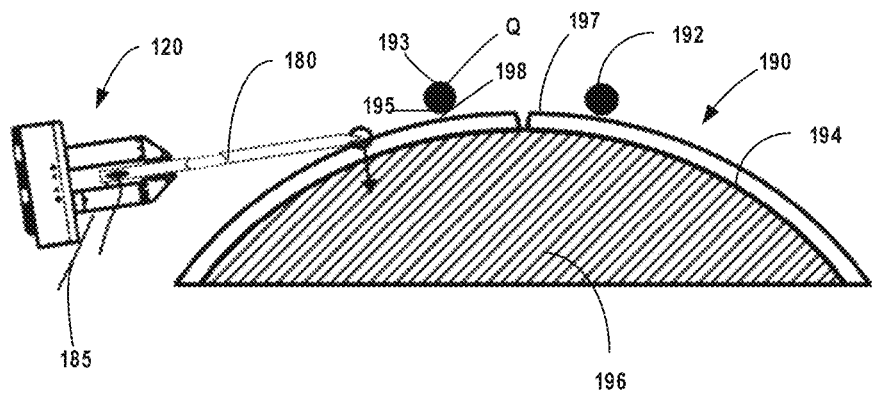

In some embodiments, the needle 180 is depressed in a direction perpendicular to the outer surface at the ready position toward the outer surface so as to deform the outer surface of the object. As shown in FIG. 5, when the needle 180 is depressed in a direction perpendicular to the outer surface toward the outer surface, a gap 198 (also referencing to FIG. 6) is formed between the bottom side 195 of the thread section 192 and the outer surface 197 of the object 190. By deforming the outer surface of the object, the scratches caused by the needle 180 tip can be completely obviated. It is to be understood that this is merely illustrative rather than limited. In some embodiments, the step of depressing the needle 180 can be omitted.

In some embodiments, the robot may further comprise a force sensor attached to the robotic arm. The force sensor is configured to sense a contact force between the needle 180 and the object. In this way, the depressing degree is determined based on the sensed contact force. In some embodiments, the depressing degree is determined in association with a material property of the object, for example, a hardness of the cover. With the force sensor, the force for deforming the outer surface of the object can be precisely controlled.

Figure 6:
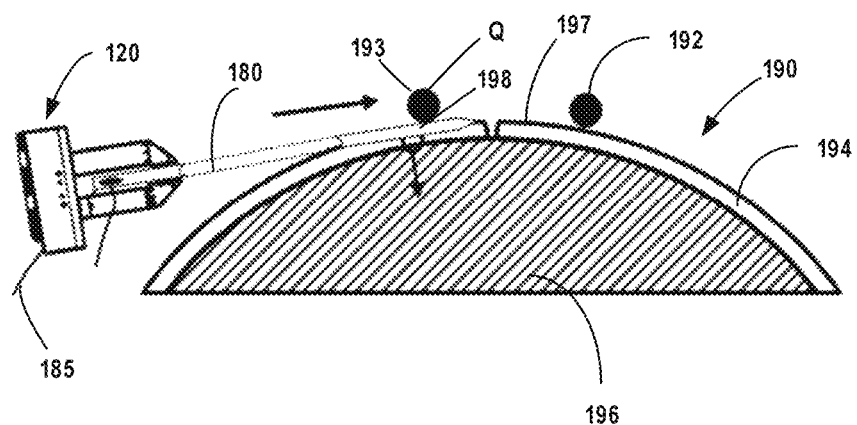

As shown in FIGS. 5 and 6, the needle 180 is linearly moved by the first distance from the first lateral side of the thread section to the second opposite lateral side of the thread section, with the needle 180 being maintained at the depressed state. The needle 180 passes the thread needle 180 without barrier.

Figure 7:
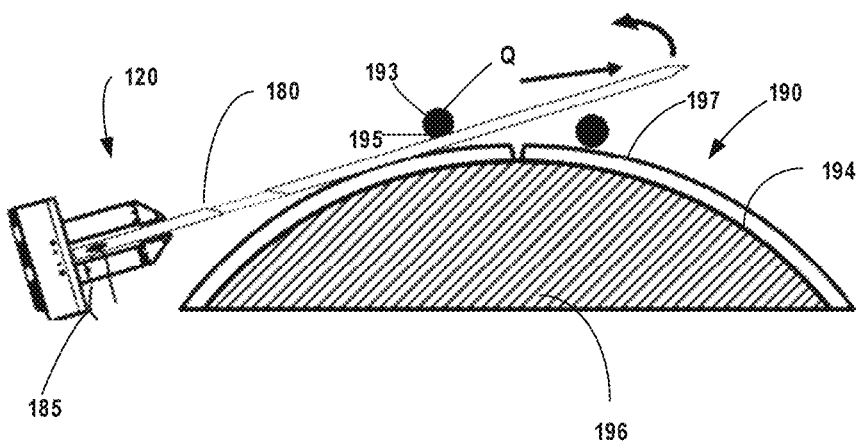

In some embodiments, as shown in FIG. 7, the posture of the needle 180 may be further adjusted to cause the tip of the needle 180 tilting up away from the outer surface after the movement of the first distance. For example, the posture of the needle 180 may be adjusted by rotating the needle 180 as shown by the rotation arrow. In some embodiments, the tilting degree of the tip of the needle 180 is determined such that further movement of the tip does not interfere with other pre-stitches. Then, the needle 180 is moved a second distance with the adjusted posture.

Figure 8:
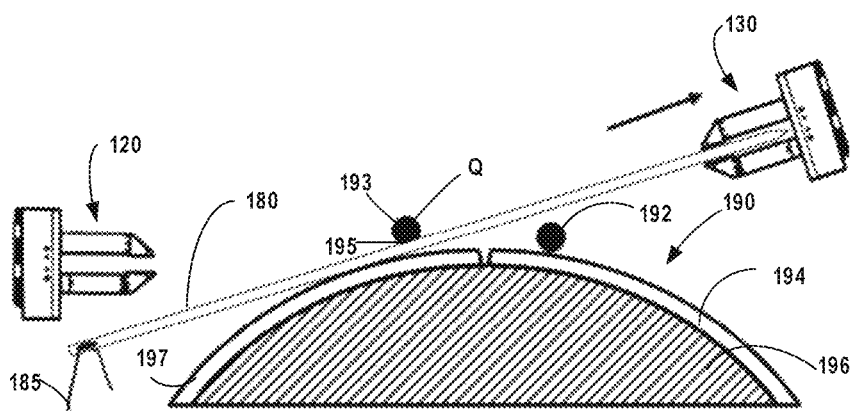

In some embodiments, as shown in FIG. 8, when a sufficient portion of the needle 180 is penetrated through the object, the needle 180 can be gripped by the second robotic arm 130. The needle 180 then can be released by the first robotic arm 120. Then, it is thus possible to pull the whole needle through the object. When the needle 180 is gripped by the second robotic arm 130, the second robotic arm 130 can move so as to pull the whole needle 180 through the object. In this way, the sewing operation for one stitch is realized.

Figure 9:
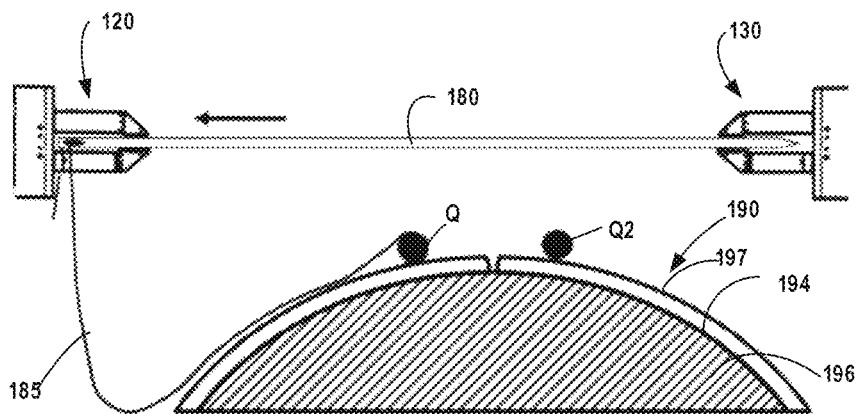

In some embodiments, as shown in FIG. 9, when the whole needle 180 penetrates through the object, the needle held by the second robotic arm may be transferred back to the first robotic arm. A subsequent sewing operation can be started by repeating the above sewing operation. It is to be understood that returning the needle 180 back to the first robotic arm 120 may be advantageous since there is strict position control requirements for movement of each robotic arms. The sewing paths of each robotic arm can be simplified. It is to be understood that this is merely illustrative and in some embodiments, a subsequent sewing operation can be started from the second robotic arm though this may involve the posture adjustment of the needle held by the robotic arm.

Referring back to FIG. 1, in some embodiments, the robot system 100 may further comprise a thread drawing device 200 which is configured to draw the loose part of the thread to penetrate the object. The thread drawing device 200 may be arranged at any proper position that can be accessed by the robotic arms, for example, by robotic arm 130. By provision of the thread drawing device 200, technical advantages can be achieved. As known, the thread for sewing is typically very thin and cannot withstand a large force. Thus, a force for drawing the loose part of the thread should not be too large so as to ensure that the thread does not break after each drawing operation and function well. Also, a length of the loose part of the thread is changeable since its length reduces after each sewing operation. Accordingly, a distance for drawing the loose part of the thread should be changeable. If the second robotic arm 130 that now carries the needle directly pulls the needle away to draw the loose part of the thread to penetrate the object, the second robotic arm should meet at least the above two requirements, which is overwhelming difficult. With the arrangement of the thread drawing device 200, the above technical problems can be removed and the loose part of the thread can be pulled through the object easily.

Figure 10:
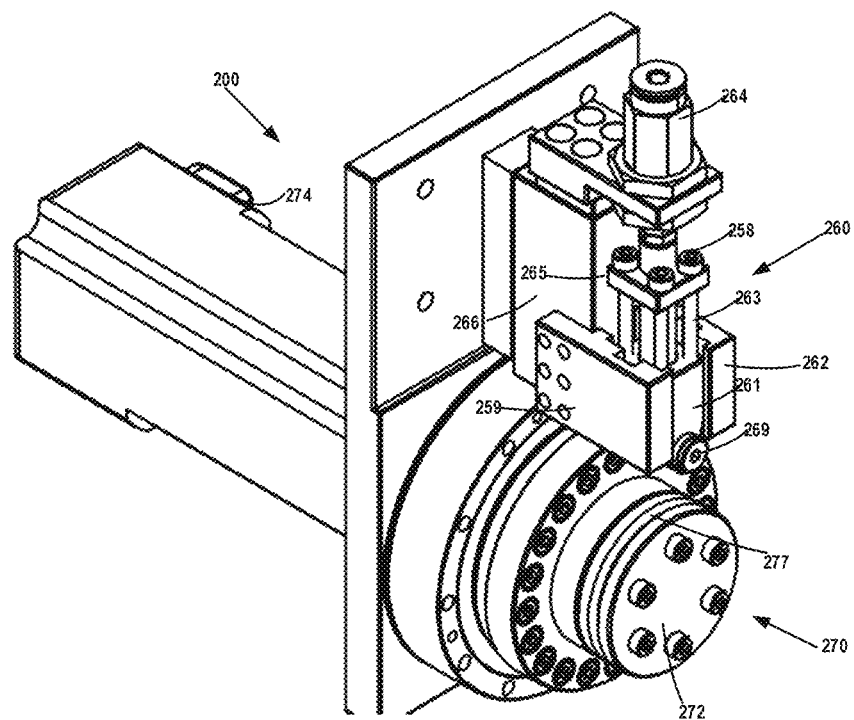
FIG. 10 is a schematic perspective view of a thread drawing device according to one example embodiment of the present disclosure.
Figure 11:
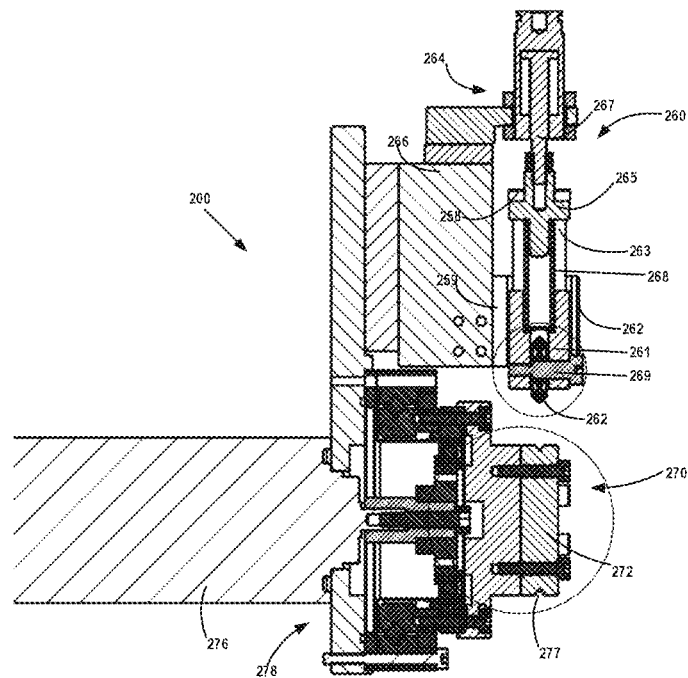
FIG. 11 is a schematic sectional view of the thread drawing device according to one example embodiment of the present disclosure, with a pressing member being disengaged from a drive wheel.
Figure 12:
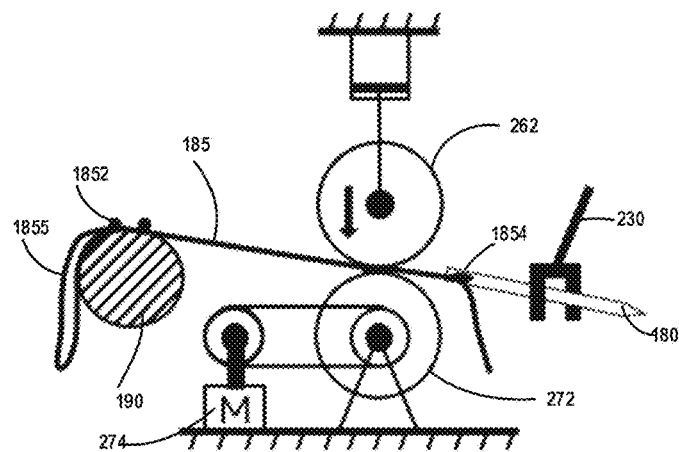
FIG. 12 is a schematic view illustrating an operation principle of how a thread is pulled with the thread drawing device according to one example embodiment of the present disclosure.

FIGS. 10-11 show schematic views of a thread drawing device 200 according to one example embodiment of the present disclosure. As shown in FIGS. 11-12, the thread drawing device 200 may comprise a drive assembly 270 and a pressing assembly 260. The drive assembly 270 comprises a drive wheel 272 and a motor 274. The motor 274 may be controlled by the controller 10. For example, the motor may receive instructions from the controller 110 to rotate the drive assembly 270 or/and to stop rotating the drive assembly 270. In some embodiments, a gear box 278 (or reducer) may be arranged between the drive wheel 272 and the motor 274 such that rotation of the drive wheel 272 may be properly designed. As shown in FIG. 4, an output shaft 279 of the motor 274 is coupled to a gear box 278 which further couples to the drive wheel 272.

The drive wheel 272 may comprise a working platform 277 for supporting a thread 185. The pressing assembly 260 may comprise a pressing member 262 configured to move between a first position and a second position. At the first position, the pressing member 262 engages the working platform 277 to clamp the thread to be pulled therebetween. When the thread 185 is clamped between the pressing member 262 and the working platform 277, the motor 274 drives to rotate the drive wheel 272 and the thread 185 is thus pulled from the fixed end 1852 toward the movable end 1854. With this arrangement, a loose part 1855 of the thread 185 can be from the fixed end 1852 toward the movable end 1854 conveniently.

In some embodiments, the thread 185 is moved from the fixed end 1852 to the movable end 1854 by a static friction force generated by a pressing force exerted by the pressing member 262. Since the drawing force for moving the thread 185 is due to the static friction force, the force acting on the thread 185 can be well controlled. In this way, the thread 185 can be well protect to avoid being subject to an excessive force to break the thread 185. Moreover, it makes it possible to adjust the static friction force by adjusting the pressing force. In this way, the force acting on the thread 185 can be easily adjusted according to requirements.

In some embodiments, the thread 185 is configured to slide when a drawing force acting upon the thread exceeds a threshold indicative of that the loose part of the thread at the fixed end has been tensioned. This threshold can be determined in association with a material of the thread. Due to this arrangement, it is unnecessary to provide additional force control sensors to control the force acting on the thread.

In some embodiments, as shown in FIGS. 10 and 11, an actuator 264 is provided for moving the pressing assembly 260. The actuator 264 may takes any proper forms as long as it ca move the pressing assembly 260 between the first and second positions. For example, the actuator may pneumatic actuator, electromagnetic actuator, or any other proper actuators. In the shown example, a pneumatic actuator 264 is shown and comprises a cylinder and a piston 267 arranged therein. The piston 267 is coupled to the pressing assembly 260. This piston 267 can perform a linear movement in response to an action of the actuator 264.

In some embodiments, as shown in FIGS. 11 and 12, a frame 266 is provided for supporting the actuator 264 and the frame 266 defines a guide rail 259 for guiding a movement of the pressing assembly 260. Due to the guide rail 259, the movement of the pressing assembly 260 can be well guided.

In some embodiments, as shown in FIGS. 11 and 12, the pressing assembly 260 comprises a base 261 for supporting the pressing member 262 and a spring 268 arranged between the base 261 and the piston 267 for elastically supporting the pressing member 262. During action of the actuator 264, the piston 267 firstly presses the spring 268 and then the pressing member 262 is moved by the spring 268. Accordingly, even if a movement distance of the piston 268 is not precise, the pressing force that the pressing assembly 260 presses the thread 185 can be well controlled. Since the thread's pulling force depends on an elastic force of spring. The elastic force of the spring can be adjusted by replacing different types of springs, for example changing spring's compressing length, or tuning the pressure of compressing air of cylinder.

In some embodiments, as shown in FIGS. 11 and 12, the pressing assembly 260 further comprises an adjustment plate 265 coupled to the piston 267 and a screw rod 263 fixed to the base 261. The spring 268 is arranged between the base 261 and the adjustment plate 265. An elastic force of the spring is adjustable by adjusting a position of the adjustment plate 265 along the screw rod 263 with respect to the base 261. When the piston 267 moves, the adjustment plate 265 is firstly moved by the piston 267. The movement of the adjustment plate 265 compresses the spring 38 which in turns moves the pressing member 262. The adjustment plate 265 may be arranged on the screw rod 263 which further engages a nut 258. By rotating the nut 258 along the screw rod 263, the elastic force of the spring 268 can be easily adjusted without changing spring's compressing length, or tuning the pressure of compressing air of cylinder.

In some embodiments, the pressing member 262 can be fixedly attached to the base 261. In some embodiments, the pressing member 262 is rotatable with respect to the base 261. This can improve a smooth movement of the thread. In some embodiments, as shown in FIG. 4, the pressing member 262 can be supported on a shaft 269. The pressing member 262 includes a central hole through which the shaft 269 extends. In some embodiments, a bearing may be arranged between the pressing member 262 and the shaft 269.

In some embodiments, the pressing member 262 may be in a form of a roller which is rotatable with respect to the base 261. The working platform 277 comprises a circumferential groove for receiving the thread 185. The thread 185 can be placed on the circumferential groove and held in the circumferential groove. In some embodiments, the circumferential groove comprises a V-shape with a first guide angle. It is to be understood that the shape of the circumferential groove is merely illustrative. The circumferential groove may be of any proper shape as long as it can receive the thread 185.

In some embodiments, the pressing member 262 comprises a convex shape. The convex shape may fit the circumferential groove. In this way, the pressing member 262 can be reliably fit in the circumferential groove. In some embodiments, the convex shape is provided with a second guide angle. The first guide angle is equal to or larger than the second guide angle so that the pressing member 262 can fit the circumferential groove. In some embodiments, a tip of the convex shape of the pressing member 262 is rounded to define a clearance for housing the thread. With this arrangement, there is always a space left to holding the thread 185 such that the thread 185 will not be over-pressed to destroy or damage the thread 185. In some embodiments, the thread is made of chemical fiber, cotton, or any other proper material for sewing.

In some embodiments, some measures may be taken to further increase the static friction force while the smooth movement of the thread would not be affected. In some embodiments, a material of a surface of the pressing member 262 is different from a material of a surface of the working platform 277. Experiment tests show that different materials of the contact surfaces may contribute to increase of the static friction force.

Next, operating principles of the thread drawing device 200 according to one example embodiment of the present disclosure are illustrated by with reference to FIG. 12. At an initial state, the pressing member 262 moves up and disengages from the drive wheel 272 and a room is left for passage of the needle. At the initial state, the thread 185 with one end tied to the needle 180 is placed onto the working platform 277 of the drive wheel 272, for example by a robotic arm 130. The working platform 277 is shaped to hold the thread 185. One end of the thread, i.e., the fixed end 1852, is fixed to the object 90 supported on the support. The other end of the thread 185, the movable end 1854, is movable or free and can be moved by the robotic arm. A loose part 1855 of the thread is adjacent to the fixed end 1852 and this loose part 1855 of the thread is corresponding to a portion of the thread which needs to pass through the object to form a stitch. It is to be understood that in the shown example, the motor 174 is configured to drive the drive wheel 172 by a belt-arrangement, this is merely illustrative and any other proper drive means can be used.

FIG. 12 shows an operation state of the thread drawing device 200. As shown by the arrow, the pressing member 262 moves down and engage the drive wheel 272. At the state, the thread 85 is clamped between the pressing member 262 and the drive wheel 272 and is subject to a pressure force from the pressing member 262.

As shown by the arrow, the pressing member 262 keeps pressing and engaging the drive wheel 272. Thus, the pressure force is continuously applied onto the thread. At this state, the motor 274 receives instructions from the controller 10 and starts to draw the thread 185. As the motor 274 rotates, the drive wheel 272 also rotates. When the drive wheel 272 rotates, the thread 185 keeps affixed to the drive wheel 272 due to the static friction force and thus also rotates. The loosed part 1855 of the thread 185 on the object 290 is gradually pulled toward the movable end 1854. As the motor 274 rotates, the whole loosed part 1855 of the thread 185 is tensioned which means the whole loosed part 1855 are completely removed.

At this state, as the motor 274 continues rotating, there is relative movement between the thread 185 and the drive wheel 272. In particular, the thread 185 begins sliding between the pressing member 262 and the drive wheel 272. This generally means that the whole loosed part 1855 of the thread 185 has been tensioned. In response to the sliding movement of the thread 185, the motor 274 stops rotation. With this arrangement, the thread 185 can be tensioned in an easy way.

When the whole loose part of the thread 185 is pulled to the free side, the motor 274 may stop rotation at a proper time and the pressing member 262 moves up and disengages from the drive wheel 272 and a room is left for passage of the needle. The robotic arm 130 may take the needle to a proper position to perform the next sewing cycle.

With the thread drawing device and the thread drawing method of the present disclosure, the loose part of the thread on the object 290 can be tensioned easily without reliance of complex force control mechanisms. Also, the thread can be well protected against damage due to over large pulling force.

Referring back to FIG. 1, the robot system 100 may further comprise an adjusting tool 370 which is configured to adjust pitches of the sewn stitches. The adjusting tool 370 may comprises a pick-up head which is configured to pick up a thread section of the sewn stitches and then are moved by a robotic arm so as to apply tensioning forces on the sewn stitches. Due to the tensioning forces on the sewn stitches, the adjacent stitches are getting closer to each other, i.e., pitches of the adjacent sewn stitches are adjusted. In this way, joining strength of the seam joint formed by the stitches can be improved. Also, outer appearance of the sewn product is improved.

In the shown example embodiment, the adjusting tool 370 is placed close to the robotic arm 120 and is exchangeable with the needle 180 carried by the robotic arm 120. When the adjustment operation is needed, the needle 180 carried by the robotic arm 120 may be replaced by the adjusting tool 370 so as to perform adjusting operations. This is merely illustrative. In some embodiments, a third robotic arm may be provided adjacent to the object and can perform the adjustment operation when necessary.

The adjusting tool 370 is configured to perform the adjusting operations. The adjusting tool 370 is of a shape that can hold a thread. In some embodiments, the adjusting tool 370 comprises a pick-up head. The pick-up head is shaped to pick up a thread. The pick-up head may comprise a thin needle head. The thin needle head is very sharp and thin and can easily penetrate a thread. This is advantageous when the adjusting tool 370 penetrates a sewn stitch.

In some embodiments, the adjusting tool 370 may comprises a concave curved portion adjacent to the thin needle head. The concave curved portion may be formed as a part of the pick-up head. The concave curved portion is configured to hold the thread firmly. Once the pick-up head picks up the thread, the thread can slightly moves along a curvature of the concave curved portion and can thus be firmly held at the held at the concave curved portion. The pick-up head is provided with a thin needle which is so thin that the pick-up head can easily pick up and hold the sewn thread. In the shown example, the curved portion may be formed as a concave portion for holding the thread. It is to be understood that the shape the adjusting tool 370 is merely illustrative and the adjusting tool 370 may be formed with any other proper shapes according to the teaching of the present disclosure.

Figure 13:
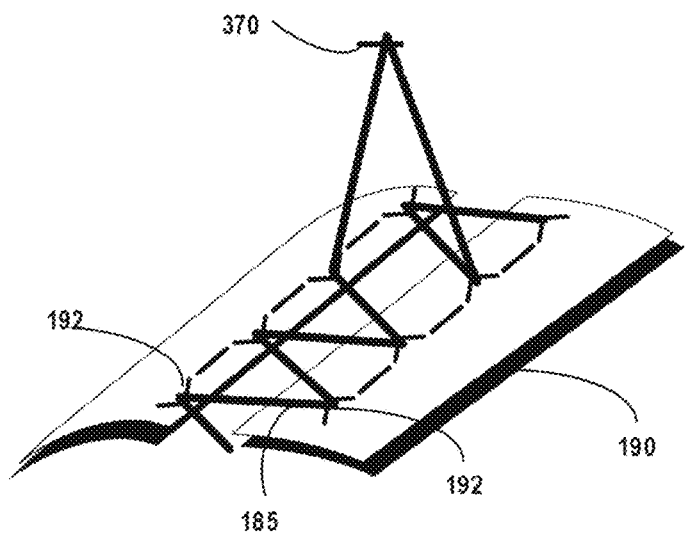
FIG. 13 is a schematic perspective view showing sewn stitches being adjusted by an adjustment tool according to one example embodiment of the present disclosure.

FIG. 13 shows a schematic perspective view of the sewn stitches 185 by the robot system for sewing an object according to one example embodiment of the present disclosure. As shown in FIG. 13, two rows of pre-stitches 192 are formed on the outer surface of the object 190 in advance and the two rows of pre-stitches 192 form a sewing zone of the object. Each of the pre-stitches includes a thread section. The sewn stitches 185 are formed by moving the thread for swing across the thread section of the pre-stitches 192 along a path defined between the thread section and the outer surface of the object 190. In the shown example, each of the sewn stitches 185 comprises a portion penetrating a pre-stitch 192 in one row and a portion penetrating a pre-stitch 192 in the other row. The sewn stitch 185 thus joins the two rows of pre-stitches 192. In this way, the cover can be sewn on the black steering wheel.

The sewn threads 285 may comprise a first end fixed to the object and a second end. The second end may be a free end or movable end. In some embodiments, the second end may be also a fixed end. A plural of stitches are formed across a sewing zone on the object between the first end and the second end, and each stitch comprises the thread section including a top side and the opposite bottom side.

In the shown example in FIG. 13, the two rows of the pre-stitches 192 are provided on the edge of the cover and the two edges meet to form the joint. The sewn stitches 185 are shown as extending across a gap between the two rows of the pre-stitches 192. This is merely illustrative rather than limited. The cover and the pre-stitches 192 can be of any proper forms. For example, in some embodiments, there are no pre-stitches 192 formed on the cover and there are a plural of holes formed on the cover. It is to be understood that the shown sewn pattern is merely illustrative and the sewn pattern may be of any other proper forms as long as the cover can be sewn on the black steering wheel. In the shown example, two rows of pre-stitches 192 are formed in advance on the object and the two rows of pre-stitches 192 are used to penetrate the thread 185 so as to sew the cover to the black steering wheel. It is to be understood that this is merely illustrative, instead of the pre-stitches 192, other measures, such as holes, may be formed for facilitate sewing.

Referring back to FIG. 1, the images of the object captured by the camera 152 can be sent to the controller 110. The controller 110 is configured to identify a plural of stitches to be tensioned, i.e., a plural of thread sections of the sewn threads 185, based on the images from the cameras. After the adjusting tool 370 passes each of the selected stitches to be adjusted from a bottom side, the adjusting tool 370 can be pulled upward so as to apply tensions onto the sewn threads 185. The sewn threads 185, in particular the adjacent sewn threads, are tensioned with the pulling force. Through the tensioning operations, the sewn threads 185 can be tightened and a firm sewing joint thus is formed by.

FIGS. 14-18 are schematic sectional process views illustrating principles of how an adjusting tool 370 is operated to perform adjusting operations according to one example embodiment of the present disclosure, showing different states of the adjusting tool 370 with respect to the position Q to be adjusted. The adjusting tool 370 is held by a robotic arm and can be moved by the robotic arm. The object 190 is provided with a number of thread sections of sewn threads 185. The position of the adjusting tool 370 may be represented by P (x, y, z), where x, y, z represents the coordinates in the coordinate system, the x-y plane represents a horizontal plane that a position Q to be tightened (which corresponds to a thread section of the sewn threads 185) is located on the object 190, and the z axis represents a direction perpendicular to the x-y plane. It is to be understood the P (x, y, z) is merely illustrative and the position of the adjusting tool 370 can be represented by any other proper coordinate system. FIGS. 14-18 shows a plane view of y-z plane in which the relative position between the adjusting tool 370 so as to better shown their position relationship.

Figure 14:
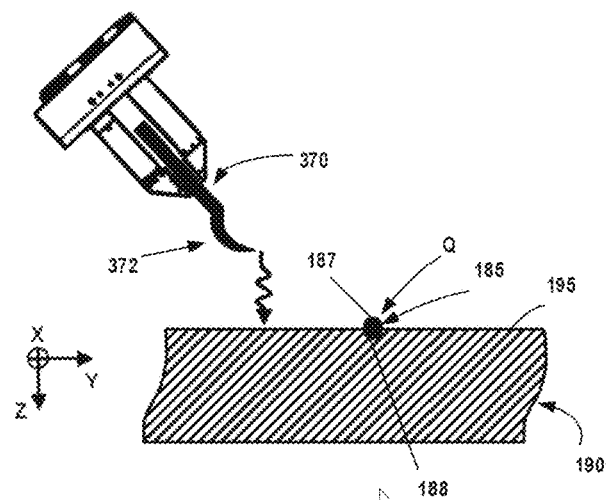
FIGS. 14-18 are schematic sectional views illustrating a principle of how an adjustment tool is operated to adjust sewn threads according to one example embodiment of the present disclosure, showing different states of the adjusting tool with respect to the sewn threads.

In FIG. 14, the adjusting tool 370 may be at an offset position before the adjusting operation. The object 190 includes a flexible outer surface 195 and a plural of sewn thread sections (shown as a black circle dot in FIG. 14) formed on or above the outer surface 195. The sewn thread sections each includes a thread section 185 including a top side 187 and an opposite bottom side 188 facing the outer surface 195. In order to ensure that there is no scratching, the adjusting tool 370 is controlled to go across the thread section 185 along a path defined between the bottom side 188 of the thread section 185 and the outer surface 195 of the object 190.

Assuming that the adjusting tool 370 is to pass the thread section 185 from a position which is denoted by the position Q in FIG. 14. The position Q is firstly determined, for example by the camera 252. The positon P of the adjusting tool 370 is also known by the robot. Thus, relative relationship between the adjusting tool 370 and the position Q is known by the controller. Once the above parameters are determined, the robotic arm 220 is lowered onto the object 190 and moves the adjusting tool 370 a first distance from the first lateral side of the thread section 185 to a second opposite lateral side of the thread section with the adjusting tool 370 to cause the adjusting tool 370 to go across the thread section. In this way, the adjusting tool 370 can pass the thread section 185 from the bottom side with less or without scratches. In some embodiments, the first distance is larger than the offset distance. This ensures that the adjusting tool 370 does pass the thread section 185 from the bottom side.

The adjusting tool 370 comprises a pick-up head which is shaped to pick up the thread once the adjusting tool 370 passes the thread section 185 from the bottom side. In some embodiments, the pick-up head is provided with a thin needle which is so thin that the pick-up head can easily pick up and hold the sewn thread.

Figure 15:
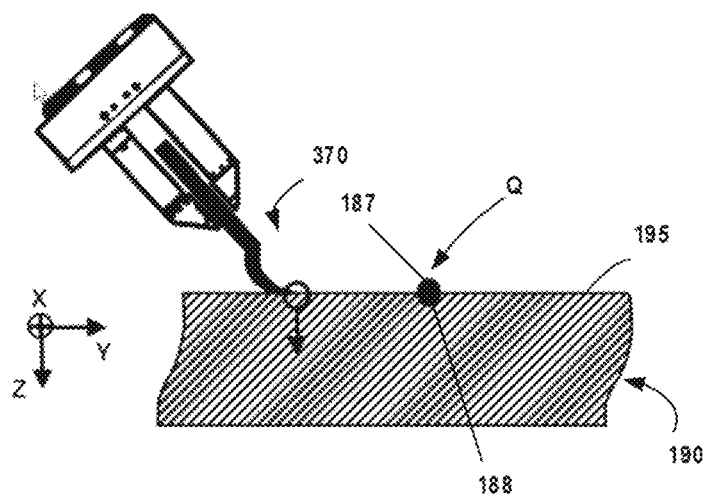

In some embodiments, as shown in FIG. 15, the adjusting tool 370 is further depressed in a direction perpendicular to the outer surface 195 at the ready position toward the outer surface 195 so as to deform the outer surface 195 of the object. In some embodiments, the pick-up head may further comprise a straight portion which is adjacent to the thin needle. By this straight portion, contact force that the adjusting tool 370 acts on the outer surface 195 can be stabilized. It is to be understood that this is merely illustrative.

Figure 16:
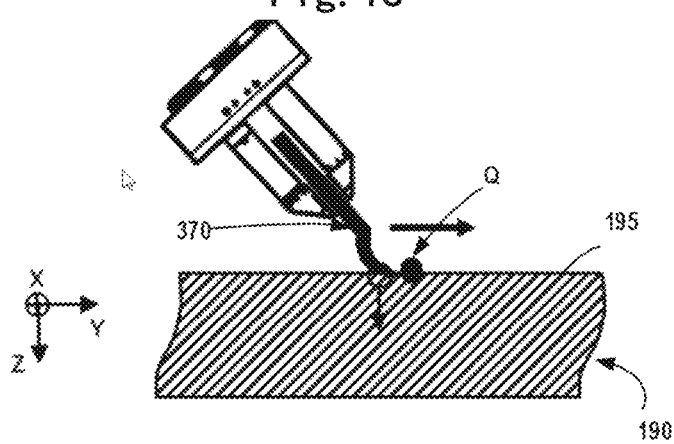

In some embodiments, as shown in FIG. 16, when the adjusting tool 370 is depressed in a direction perpendicular to the outer surface 195 toward the outer surface 195, the adjusting tool 370, at least its pick-up head, can go through the bottom side 188 of the thread section 185 and the outer surface 195 of the object 190 without barrier. By deforming the outer surface 195 of the object, the scratches caused by the adjusting tool 370 can be completely obviated. It is to be understood that this is merely illustrative rather than limited. In some embodiments, the step of depressing the adjusting tool 370 can be omitted. In some embodiments, the robot may further comprise a force sensor attached to the robotic arm. The force sensor is configured to sense a contact force between the adjusting tool 370 and the object. In this way, the depressing degree is determined based on the sensed contact force. In some embodiments, the depressing degree is determined in association with a material property of the object, for example, a hardness of the cover. With the force sensor, the force for deforming the outer surface 195 of the object can be precisely controlled.

Figure 17:
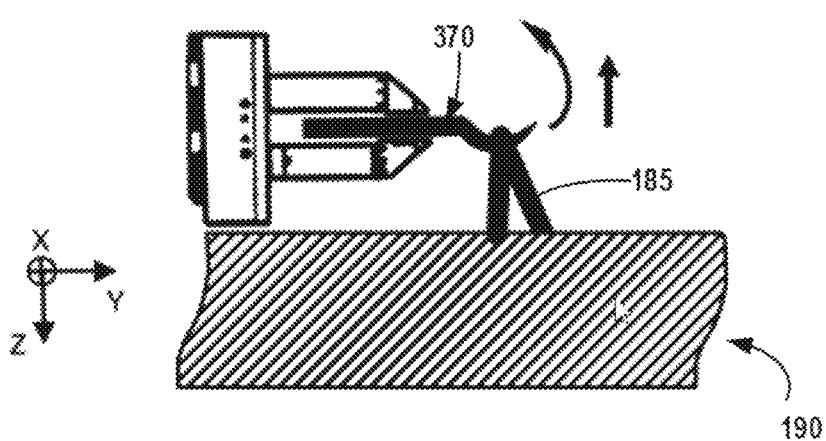

In some embodiments, as shown in FIG. 17, a posture of the adjusting tool 370 may be adjusted to cause the adjusting tool 370 tilting up a bit away from the outer surface 195 after the movement of the first distance. For example, the posture of the adjusting tool 370 may be adjusted by rotating the adjusting tool 370, as shown by the rotation arrow shown in FIG. 17. In this way, the thread 185 can be held firmly on the adjusting tool 370 in order to avoid accidental separation from the adjusting tool 370.

Figure 18:
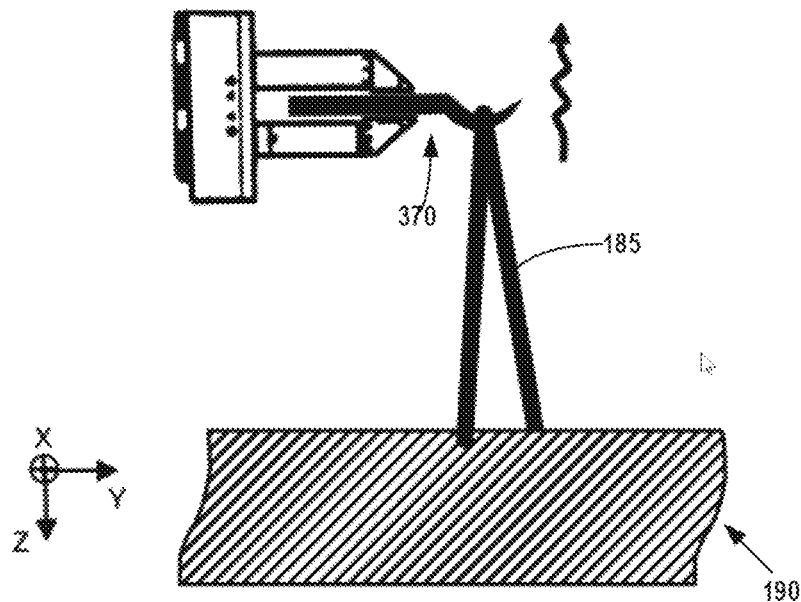

In some embodiments, as shown in FIG. 18, the adjusting tool 370 is moved a second distance in a direction away from the outer surface 195 of the object with the adjusted posture. By the movement of the adjusting tool 370, a tensioning force is applied to the sewn threads 185 which in turn tighten the sewn stitches, in particular, the adjacent stitches that are adjacent to the position Q. Accordingly, the pitches of the adjacent stitches are adjusted properly. It is to be understood that in the shown example, the pulling direction is perpendicular to the outer surface 195 of the object. This is merely illustrative, the pulling direction or the tensioning direction may be any other proper directions as long as the thread 185 does not fall off the adjusting tool 370.

In some embodiments, a force sensor may be attached to the robotic arm 220 for sensing a force acting upon the adjusting tool 370. In response to the force being equal to a predetermined threshold, the pulling movement of the adjusting tool 370 is stopped. The predetermined threshold may be determined in association with a seam pattern of the sewn threads. The seam pattern may determine the appearance of the finishing seam and the tightness need of the joint. With the force sensor, it is ensured that a fixed force is acted upon the adjusting tool 370 and the appearance of the finishing seam is further improved. The predetermined threshold can be got from experiences or try-out tests.

In some embodiments, after the threads 185 are adjusted or tensioned by the adjusting tool 370, the adjusting tool 370 may retract from the threads 185, for example by rotating toward the outer surface 195 of the object. Then the adjusting tool 370 can be moved to an initial standby position and is prepared for another adjustment cycle. For the whole seam, a plural of tensioning operations are performed every several stitches, the whole joint sewing seam can thus be uniformly tightened to the required appearance of tension in automatic way.

In the shown example embodiments, the adjusting tool 370 comprises a pick-up head 272 which is shaped to pick up a thread. In some embodiments, the adjusting tool does not comprise a pick-up head. In this case, before the adjusting tool go through the thread, a posture of the adjusting tool may be adjusted such that a tip of the adjusting tool is tangent to the outer surface of the object. This means, when the adjusting tool 370 penetrates the object or passes through the thread section 185 from its bottom side, a direction of the tip of the adjusting tool 370 is always tangent to the outer surface of the object at the positon Q. With these measures, the orientation of the adjusting tool 370 can be precisely controlled and scratches caused by the adjusting tool 370 are reduced.

Figure 19:
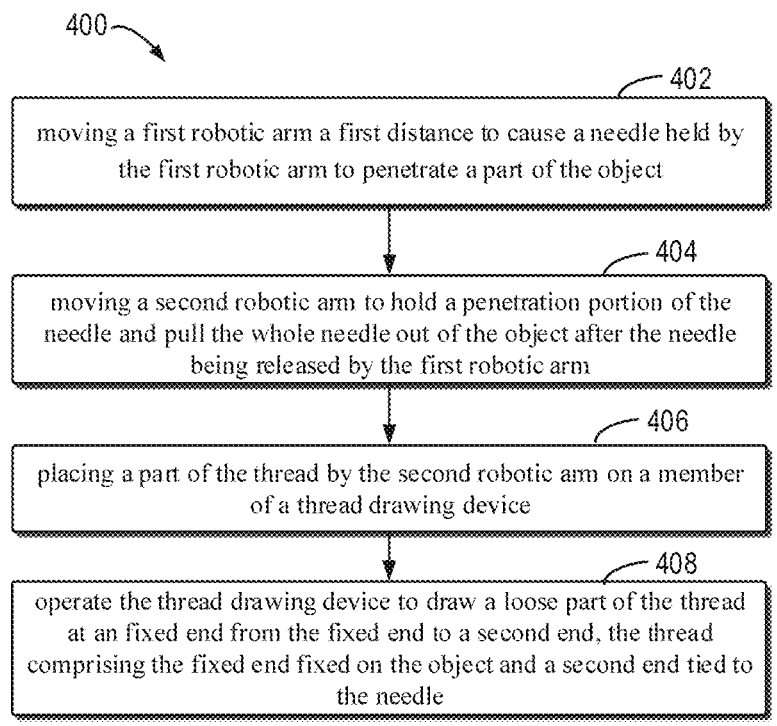
FIG. 19 is a flow chart of a method for sewing an object according to one example embodiment of the present disclosure.

FIG. 19 is a flow chart of a method 400 for sewing an object according to one example embodiment of the present disclosure. As shown in FIG. 19, the method 400 comprises the following actions. At a block 402, a first robotic arm is moved by a first distance to cause a needle held by the first robotic arm to penetrate a part of the object. At a block 404, the second robotic arm is moved to hold a penetration portion of the needle and pulls the whole needle out of the object after the needle being released by the first robotic arm. At a block 406, a part of the thread is placed by the second robotic arm on a member of a thread drawing device. At a block 408, the thread drawing device is operated to draw a loose part of the thread at a fixed end from the fixed end to a movable end. The operation of the thread drawing device is independent of the operation of the second robotic arm. The thread comprises the fixed end fixed on the object and a movable end tied to the needle. In this way, the object can be automatically sewn by a robot.

In some embodiments, the method may further comprise transferring the needle held by the second robotic arm back to the first robotic arm, and to perform a subsequent sewing operation.

In some embodiments, the method may further comprise adjusting sewn threads on the object by an adjusting tool. The device for adjusting sewn threads comprises an adjusting tool. The adjusting tool is caused to partially go across the sewn threads along a path defined between a bottom side of one sewn thread and an outer surface of the object and are moved upward away from the outer surface so as to adjust pitches between the sewn stitches. The sewn thread comprise a first end fixed to the object and a second end, a plural of stitches are formed across a sewing zone on the object between the first end and the second end, and each stitch comprises the thread section including a top side and the opposite bottom side. In this way, the joints of the sewing seam can be strengthened and outer appearance of the product can be further improved.

Through the teachings provided herein in the above description and relevant drawings, many modifications and other embodiments of the disclosure given herein will be appreciated by those skilled in the art to which the disclosure pertains. Therefore, it is understood that the embodiments of the disclosure are not limited to the specific embodiments of the disclosure, and the modifications and other embodiments are intended to fall within the scope of the disclosure. In addition, while exemplary embodiments have been described in the above description and relevant drawings in the context of some illustrative combinations of components and/or functions, it should be realized that different combinations of components and/or functions can be provided in alternative embodiments without departing from the scope of the disclosure. In this regard, for example, it is anticipated that other combinations of components and/or functions that are different from the above definitely described will also fall within the scope of the disclosure. While specific terms are used herein, they are only used in a general and descriptive sense rather than limiting.

What is claimed is:

1. A robot for sewing an object, comprising:
   a first robotic arm adapted to hold a needle, the needle, carrying a length of a thread,
   a second robotic arm adapted to hold the needle, and
   a controller configured to move the first and second robotic arm to perform a plural of sewing operations so as to form a plural of stitches on the object, each sewing operation comprising:
      moving the first robotic arm a first distance to cause the needle to penetrate a part of the object; and
      moving the second robotic arm to hold a penetration portion of the needle and pull the whole needle out of the object after the needle being released by the first robotic arm;
   wherein the object includes a flexible outer surface and pre-stitches formed on the outer surface, each of the pre-stitch includes a thread section including a top side and an opposite bottom side facing the outer surface, and the controller is configured to cause the needle to go across the thread section along a path defined between the bottom side of the thread section and the outer surface of the object;
   wherein for the each sewing operation the controller is configured to:
      determine a position to be sewed which corresponds to a thread section of the pre-stitches;
      move the needle to a ready position at a first lateral side of the thread section which is offset from the position to be sewed by an offset distance;
      determine a posture of the needle such that a longitudinal axis of the needle is tangent to the outer surface of the object at which the path is located; and
      move the needle the first distance from the first lateral side of the thread section to a second opposite lateral side of the thread section with the needle in the determined posture to cause the needle to go across the thread section, the first distance being larger than the offset distance.

2. The robot according to claim 1, wherein the controller is configured to:
   depress the needle in a direction perpendicular to the outer surface at the ready position toward the outer surface so as to deform the outer surface of the object; and
   linearly move the needle the first distance from the first lateral side of the thread section to the second opposite lateral side of the thread section, with the needle being maintained at the depressed state.

3. The robot according to claim 1, further comprising a camera configured to capture an image of the object, the controller being configured to identify a plural of positions to be sewed based on the image from the camera.

4. The robot according to claim 3, wherein the controller is configured to generate a sewing pattern which defines the positions to be sewed in order based on the identified plural of positions to be sewed.

5. The robot according to claim 1, wherein the first and second robotic arm are adapted to adjust a gripping length of the needle respectively so that a tip of the needle is located to the same position relative to the respective robotic arms.

6. The robot according to claim 5, wherein the first robotic arm is adapted to hold a root portion of the needle, and the second robotic arm is adapted to hold a tip portion of the needle.

7. The robot according to claim 1, wherein the controller is further configured to handover, for each sewing operation, the needle held by the second robotic arm back to the first robotic arm, and to perform a subsequent sewing operation by repeating the each sewing operation.

8. The robot according to claim 1, wherein the object comprises a cover pre-wrapped around a steering wheel, the cover being made of leather, leatherette, or fabric, and the cover comprises two rows of plural of pre-stitches adjacent to each other which define a sewing region for the sewing operations.

9. The robot according to claim 1, further comprising a second camera configured to capture an image of the object, the controller being configured to visually inspect the object based on the image from the second camera and to provide an inspection result indicating a suitability of whether the object can be sewed by the apparatus before the sewing operation or indicating a sewing quality after the sewing operation.

10. The robot according to claim 1, further comprising a thread drawing device configured to draw a loose part of the thread at a fixed end from the fixed end to a movable end, the thread comprising the fixed end fixed on the object and a movable end tied to the needle.

11. The robot according to claim 10, wherein the thread drawing device comprises:
   a drive assembly comprising a drive wheel comprising a working platform for supporting the thread on the needle carried by the second robotic arm,
   a press assembly comprising a pressing member configured to move between a first position at which the pressing member engages the working platform to clamp the thread to be pulled therebetween and a second position at which the pressing member disengages from the working platform to release the thread to be pulled; and
   a motor configured to rotate the drive wheel when the pressing member is at the first position so as to draw the loose part of the thread at the fixed end to the movable end.

12. The robot according to claim 1, further comprising:
   a device for adjusting sewn threads on the object,
   wherein the device for adjusting sewn threads comprises an adjusting tool,
   wherein the adjusting tool is caused to partially go across the sewn threads along a path defined between a bottom side of one sewn thread and an outer surface of the object and are moved upward away from the outer surface so as to adjust pitches between the sewn stitches,
   wherein the sewn thread comprise a first end fixed to the object and a second end, a plural of stitches are formed across a sewing zone on the object between the first end and the second end, and each stitch comprises the thread section including a top side and the opposite bottom side.

13. A method for sewing an object, comprising
moving a first robotic arm a first distance to cause a needle held by the first robotic arm to penetrate a part of the object;
moving a second robotic arm to hold a penetration portion of the needle and pull the whole needle out of the object after the needle being released by the first robotic arm;
placing a part of a thread by the second robotic arm on a member of a thread drawing device; and
operate the thread drawing device to draw a loose part of the thread at a fixed end from the fixed end to a second end, the thread comprising the fixed end fixed on the object and a second end tied to the needle.

14. The method according to claim 13, further comprising transferring the needle held by the second robotic arm back to the first robotic arm, and to perform a subsequent sewing operation.

15. A robot for sewing an object, comprising:
a first robotic arm adapted to hold a needle, the needle, carrying a length of a thread,
a second robotic arm adapted to hold the needle, and
a controller configured to move the first and second robotic arm to perform a plural of sewing operations so as to form a plural of stitches on the object, each sewing operation comprising:
moving the first robotic arm a first distance to cause the needle to penetrate a part of the object; and
moving the second robotic arm to hold a penetration portion of the needle and pull the whole needle out of the object after the needle being released by the first robotic arm;
wherein the object comprises a cover pre-wrapped around a steering wheel, the cover being made of leather, leatherette, or fabric, and the cover comprises two rows of plural of pre-stitches adjacent to each other which define a sewing region for the sewing operations.

16. The robot according to claim 15, further comprising a camera configured to capture an image of the object, the controller being configured to identify a plural of positions to be sewed based on the image from the camera.

17. The robot according to claim 16, wherein the controller is configured to generate a sewing pattern which defines the positions to be sewed in order based on the identified plural of positions to be sewed.

18. The robot according to claim 15, wherein the first and second robotic arm are adapted to adjust a gripping length of the needle respectively so that a tip of the needle is located to the same position relative to the respective robotic arms.

19. The robot according to claim 18, wherein the first robotic arm is adapted to hold a root portion of the needle, and the second robotic arm is adapted to hold a tip portion of the needle.

20. The robot according to claim 15, wherein the controller is further configured to handover, for each sewing operation, the needle held by the second robotic arm back to the first robotic arm, and to perform a subsequent sewing operation by repeating the each sewing operation.

* * * * *